US011816358B2

(12) United States Patent
Labat et al.

(10) Patent No.: US 11,816,358 B2
(45) Date of Patent: Nov. 14, 2023

(54) PRESERVING APPLICATION DATA ORDER IN MEMORY DEVICES

(71) Applicant: Micron Technology, Inc., Boise, ID (US)

(72) Inventors: Pierre Labat, Campbell, CA (US); Nabeel Meeramohideen Mohamed, Round Rock, TX (US)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 17/410,228

(22) Filed: Aug. 24, 2021

(65) Prior Publication Data

US 2023/0065300 A1 Mar. 2, 2023

(51) Int. Cl.
*G06F 3/06* (2006.01)
*G06F 12/02* (2006.01)

(52) U.S. Cl.
CPC ............ *G06F 3/0659* (2013.01); *G06F 3/064* (2013.01); *G06F 3/0604* (2013.01); *G06F 3/0679* (2013.01); *G06F 12/0246* (2013.01); *G06F 2212/7201* (2013.01)

(58) Field of Classification Search
CPC ...... G06F 3/0659; G06F 3/0604; G06F 3/064; G06F 3/0679; G06F 12/0246; G06F 2212/7201

See application file for complete search history.

(56) References Cited

U.S. PATENT DOCUMENTS

| | | | | |
|---|---|---|---|---|
| 10,097,588 | B2* | 10/2018 | Lee | H04L 67/303 |
| 2009/0271562 | A1* | 10/2009 | Sinclair | G06F 12/0246 |
| | | | | 711/E12.008 |
| 2013/0275660 | A1* | 10/2013 | Bennett | G06F 12/0246 |
| | | | | 711/103 |
| 2014/0108416 | A1* | 4/2014 | Hornkvist | G06F 16/2272 |
| | | | | 707/741 |
| 2015/0095546 | A1* | 4/2015 | Bennett | G06F 12/00 |
| | | | | 711/5 |
| 2019/0235779 | A1* | 8/2019 | Li | G06F 16/1847 |
| 2021/0223994 | A1* | 7/2021 | Kanno | G06F 3/0679 |
| 2022/0075545 | A1* | 3/2022 | Agarwal | G06F 11/1004 |
| 2022/0156087 | A1* | 5/2022 | Karr | G06F 9/4401 |

* cited by examiner

*Primary Examiner* — Tasnima Matin
(74) *Attorney, Agent, or Firm* — Lowenstein Sandler LLP

(57) ABSTRACT

A system and method for reordering data blocks received from a zone of a memory device. An example method includes sending, by a host system to a memory sub-system comprising a memory device, a plurality of write commands; receiving, by the host system from the memory sub-system, block allocation metadata, wherein the block allocation metadata references one or more locations in the memory device corresponding to a zone; generating, by the host system, a reorder map based on the block allocation metadata; reading a plurality of data blocks associated with the zone; and reordering, by the host system, the plurality of data blocks based on the reorder map.

20 Claims, 6 Drawing Sheets

REORDER MAP 320

| Structured Data Block Number | Distance to Logical Block Number in the Zone |
|---|---|
| 0 | 1 |
| 1 | -1 |
| 2 | 1 |
| 3 | -1 |

FIG. 3B

REORDER MAP 310

| Structured Data Block Number | Logical Block Number in the Zone |
|---|---|
| 0 | 1 |
| 1 | 0 |
| 2 | 3 |
| 3 | 2 |

FIG. 3A

PRESERVING APPLICATION DATA ORDER IN MEMORY DEVICES

TECHNICAL FIELD

Embodiments of the disclosure relate generally to memory sub-systems, and more specifically, relate to preserving application data order in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3A-3B schematically illustrate example reorder maps generated by the applications, in accordance with some embodiments of the present disclosure.

DETAILED DESCRIPTION

Figure 1:
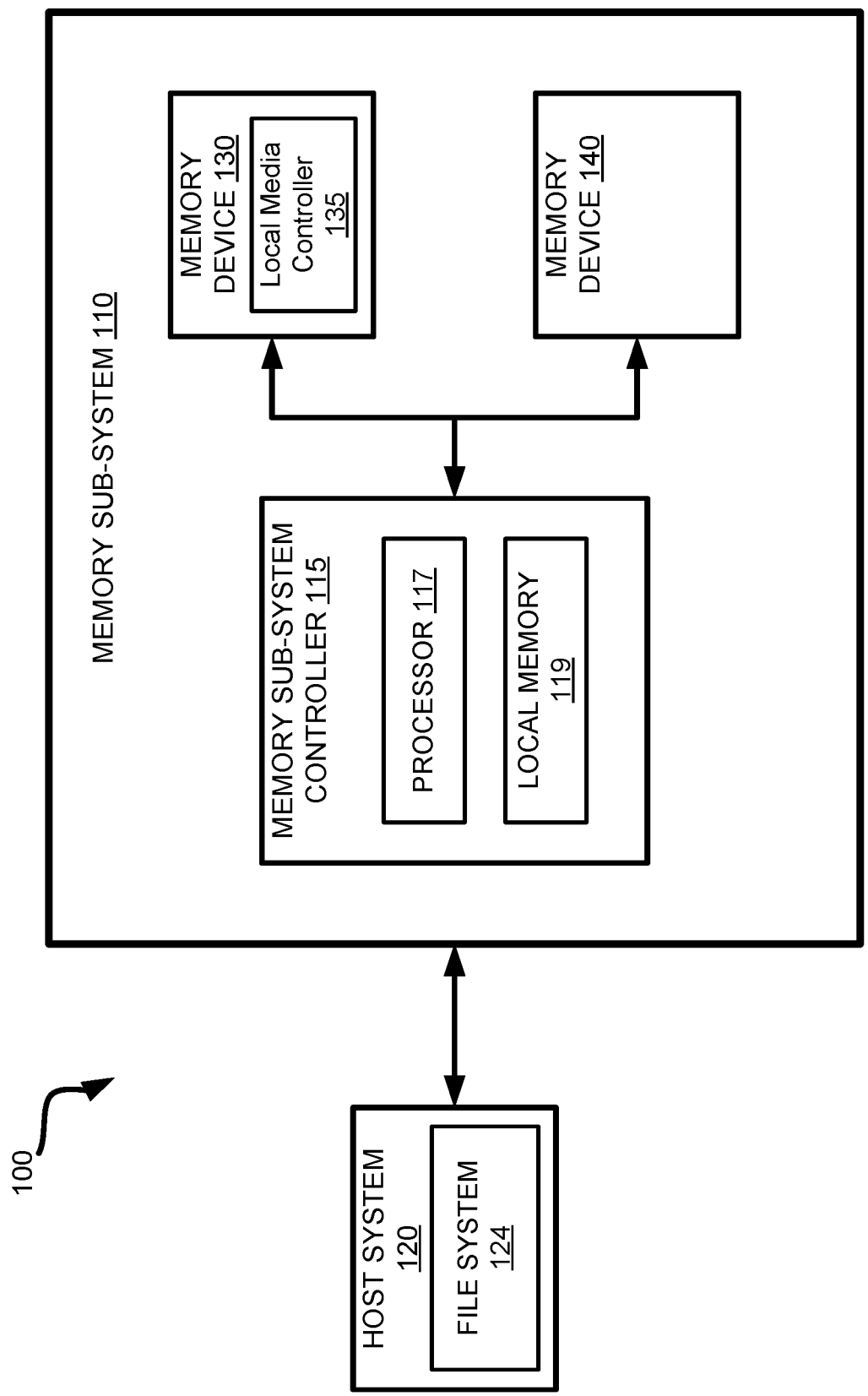
FIG. 1 illustrates an example computing system that includes a host system and a memory sub-system, in accordance with some embodiments of the present disclosure.

Aspects of the present disclosure are directed to preserving application data order in memory devices. The memory sub-system can be a storage device, a memory module, or a combination of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a negative-and (NAND) memory device. Other examples of non-volatile memory devices are described in conjunction with FIG. 1. A non-volatile memory device is a package of one or more dies. Each die can include one or more planes. For some types of non-volatile memory devices (e.g., NAND devices), each plane includes a set of physical blocks. Each block consists of a set of pages. Each page includes a set of memory cells ("cells"). A cell is an electronic circuit that store information. Depending on the cell type, a cell can store one or more bits of binary information, and has various logic states that correlate to the number of bits being stored. The logic states can be represented by binary values, such as "0" and "1," or combinations of such values.

The memory sub-system and memory devices can store data from the host system in storage media, e.g., integrated circuit (IC) dies having addressable memory cells that individually store the data. Some memory sub-systems can randomly allocate portions of data to the memory devices and in small increments of data, e.g., four kilobytes (KB). These random allocations of a page or a block of data can cause non-sequential and/or random writes to the memory devices. This practice can result in high costs in memory, e.g., dynamic random access memory (DRAM), static random access memory (SRAM), or persistent memory, for storing mapping data structures that track logical-to-physical (LTP) address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of memory mapping overhead. Additionally, periodic snap-shotting and logging is done to persist the mapping data structures across shutdowns and surprise power failure situations. This can add additional write overhead to the IC dies and performance loss.

Storage stacks can take advantage of sequential input-output (TO) memory device efficiencies. For example, storage stacks included in file systems group data by locality (e.g., according to thread, process, or application) and write the data sequentially to storage devices. File systems can then write data to different localities as parallel sequential streams to storage devices, each stream being associated with its own locality. Locality can reference either temporal locality or spatial locality. Data having temporal locality is data that a processor tends to access repetitively over a short period of time, e.g., data written, over-written, and trimmed around the same time. Data having spatial locality captures when a memory device references a particular storage location at a particular time, then the memory device is likely to reference nearby memory locations in the near future. In this case, a processor can attempt to determine the size and shape of the area around the current reference for which it is worthwhile to prepare for faster access for subsequent reference. Reference to sequential locality is a special case of spatial locality that occurs when data elements are arranged and accessed linearly, such as in traversing the elements in a one-dimensional array.

When data items having locality are written sequentially, the data items are written to a group of memory cells that is referred to as a "zone", where each zone can store multiple physical blocks of data. Thus, the mapping of a particular data group as a zone in the LBA space can be recorded at a higher granularity (e.g., megabytes instead of kilobytes), which significantly reduces the size of the metadata. The mapping space associated with the LBA space can be referred to as zoned namespace (ZNS), and a memory device written in this manner referred to as a ZNS memory device. In one example, a data group is made up of multiple blocks of data having either temporal and/or spatial locality, where each data block corresponds to a physical block (e.g., erase unit) of the IC dies. In one embodiment, the physical block of a memory device can be around 16 megabytes (MB) in size. The groups of memory cells (or zones) can be at least two to four times (or more) the size of the physical block. Accordingly, the zones can store at least 64 MB of data (e.g., 64 MB, 128 MB, 256 MB, 512 MB, or more), each of which is significantly larger than four kilobytes (KB).

In certain host operating systems, a file system handles management of files and metadata utilized for organization of files and allocation of space in the memory devices necessary to write the files and metadata as they are generated. File systems of certain host operating systems such as Linux, Unix, and the like, allocate block groups (e.g., file system storage units) to a series of physical addresses at which the memory device would store the block group. The files can include file data, file metadata, directory structure, free space manager, and the like, and other data structures (or objects) capable of packaging data/metadata and being written to the memory device, which will be discussed in more detail. Some file metadata can be associated with the file (e.g., index nodes (inodes)). The file systems typically allocate certain types of block groups to a particular series of physical addresses of the memory device based on whether the block groups contain data or metadata, and try not to intermix the data and metadata within these particular series of physical addresses.

In some implementations, the host system (for example, via an application) can send multiple write commands to the memory sub-system, in order to store data (e.g., a file) on a memory device at the memory sub-system. The memory sub-system controller can store the write commands in several write queues, and program the data from the write queues in any order. While the host system sequentially submits the write commands directed at a zone, the write commands can be reordered by the memory sub-system controller before they are processed, resulting in errors during a subsequent read operation. The host system can avoid such error by using a zone append command. The zone append command is a write operation that specifies the first logical block of a zone as the write position. When executing the write command, the memory sub-system controller can write the data within the zone indicated, but do so at the current zone write pointer position. This change in the write position is automatic and the effective write position for the data is indicated to the host system through block allocation metadata, which allows the host system to simultaneously submit several zone append commands and let the memory sub-system controller process the zone append commands in any order.

Upon completion of the write commands, the location of the written data within the zone may not correspond to the host system issuing order as the memory sub-system controller may have reordered the write command execution. The host system can discover the effective position of the data written by a certain write command through the block allocation metadata. For example, the host system can use the block allocation metadata to map the zone in a set of logical addresses. However, if the data in the zone has been reordered, the mapping to the logical address will be out of order from the order issued by the host system. Thus, the data will be corrupted.

In some implementations, the application can copy the data from the logical address range into a memory buffer and, using the block allocation metadata and file metadata, re-order the data or use a translation layer to offset each data block retrieved into a correct order. However, management of the retrieved data within the application adds a level of complexity because the application can't directly access its structured data that is mapped to memory. Further, management within the application require additional memory, which adds latency and central processing unit (CPU) overhead to access the data. The added complexity and overhead eliminate the advantages offered by writing to zones with the zone append command.

Aspects of the present disclosure address the above and other deficiencies through configuring the file system of the host system with the ability to reorder out-of-order data blocks read from a memory device. In particular, in order to store data (e.g., a file) on disk, an application of a host system can issue a set of write commands to program the data to a zone. The data can be an ordered set of sequential data blocks. The memory sub-system controller can process the set of write commands in an order that is different from the sequential order specified by the structured set, causing the data blocks to be programmed out-of-order in the zone. For example, the order of the structured set of data can be data block 0, followed by data block 1, followed by data block 2, and followed by data block 3. A specified zone having an address range of 0-16383 can include four sequential blocks (a first block including LBAs 0-4095, a second block including LBAs 4096-8191, a third block including LBAs 8192-12288, and a fourth block including LBAs 12288-16383). The memory system controller can process the structured set of data out of order by programming data block 0 to the second block (LBAs 4096-8191), data block 1 to the first block (LBAs 0-4095), data block 2 to the fourth block (LBAs 12288-16383), data block 3 to the third block (LBAs 8192-12287). Once programmed, the memory sub-system can send, to the application, the block allocation metadata. Using the block allocation metadata (such as the logical addresses of a contiguous area of blocks in a zone) and the file metadata relating to the write commands (such as the intended structured order of the data blocks), the application can generate a reorder map and send the reorder map to the file system. The reorder map can be a data structure that maps the position of a given data block in the ordered set of data blocks to its corresponding position programmed in the zone. In one example, the reorder map can include each data block number (e.g., the position of each data block in the ordered set of sequential data blocks) correlated to the logical block number as counted from the initial zone write pointer position. In another example, the reorder map can include each structured data block number mapped to an offset value. Each offset value can indicate how many blocks spaces, in the zone, each data block is shifted from its intended location. For example, if the second data block of a structured set is programmed to the fourth block space in a zone, the offset value can be −2.

Responsive to the application issuing a read access request for the data (e.g., the file) stored in the zone, the file system can receive the file metadata and the reorder map from the application. Once the requested data (e.g., a set of data block) is received from the memory sub-system, the file system can reorder the data block using the reorder map, and store the ordered data in a file system cache. The application can then directly access the ordered data from the cache. The application can repeatedly access the cache to retrieved the ordered data rather than request the data from the memory sub-system during each read access request. That is, the data needs to be retrieved from the memory sub-system only once, is reordered and stored in the cache, and then can be access repeatedly from the cache. Accordingly, the application can retrieve the ordered data from the cache without needing to reorder it using application-based resources or repeatedly accessing the memory sub-system.

Advantages of the present disclosure include but are not limited enabling application to directly access correctly ordered data that was written to a zone out-of-order. Further, by enabling the file system to reorder the data from zones, and cache the reordered data, the application reduces resource requirements and overhead necessary to access the data. This reduces latency experienced by the application and improves speed and performance. Other advantages will be apparent to those skilled in the art of memory access from memory devices discussed hereinafter.

FIG. 1 illustrates an example computing system 100 that includes a memory sub-system 110 and a host system 120 in accordance with some embodiments of the present disclosure. The memory sub-system 110 can include media, such as one or more non-volatile memory devices (e.g., memory device 130), one or more volatile memory devices (e.g., memory device 140), or a combination of such. Each memory device 130 or 140 can be one or more memory component(s).

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands from the host system 120 and can convert the commands into appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for memory management within the same memory device package. An example of a managed memory device is a managed NAND (MNAND) device.

The computing system 100 includes a file system 124 in the host system 120 that is configured with data organization functionality discussed herein throughout the Figures. In some embodiments, the host system 120 includes at least a portion of the file organization and storage allocation functionality. In other embodiments, or in combination, the controller 115 and/or a processing device of the host system 120 includes at least a portion of the file organization and storage allocation functionality. For example, the controller and the processing device (processor) of the host system 120 can be configured to execute instructions stored in memory for performing the operations of the file organization and storage allocation functionality described herein.

Figure 2:
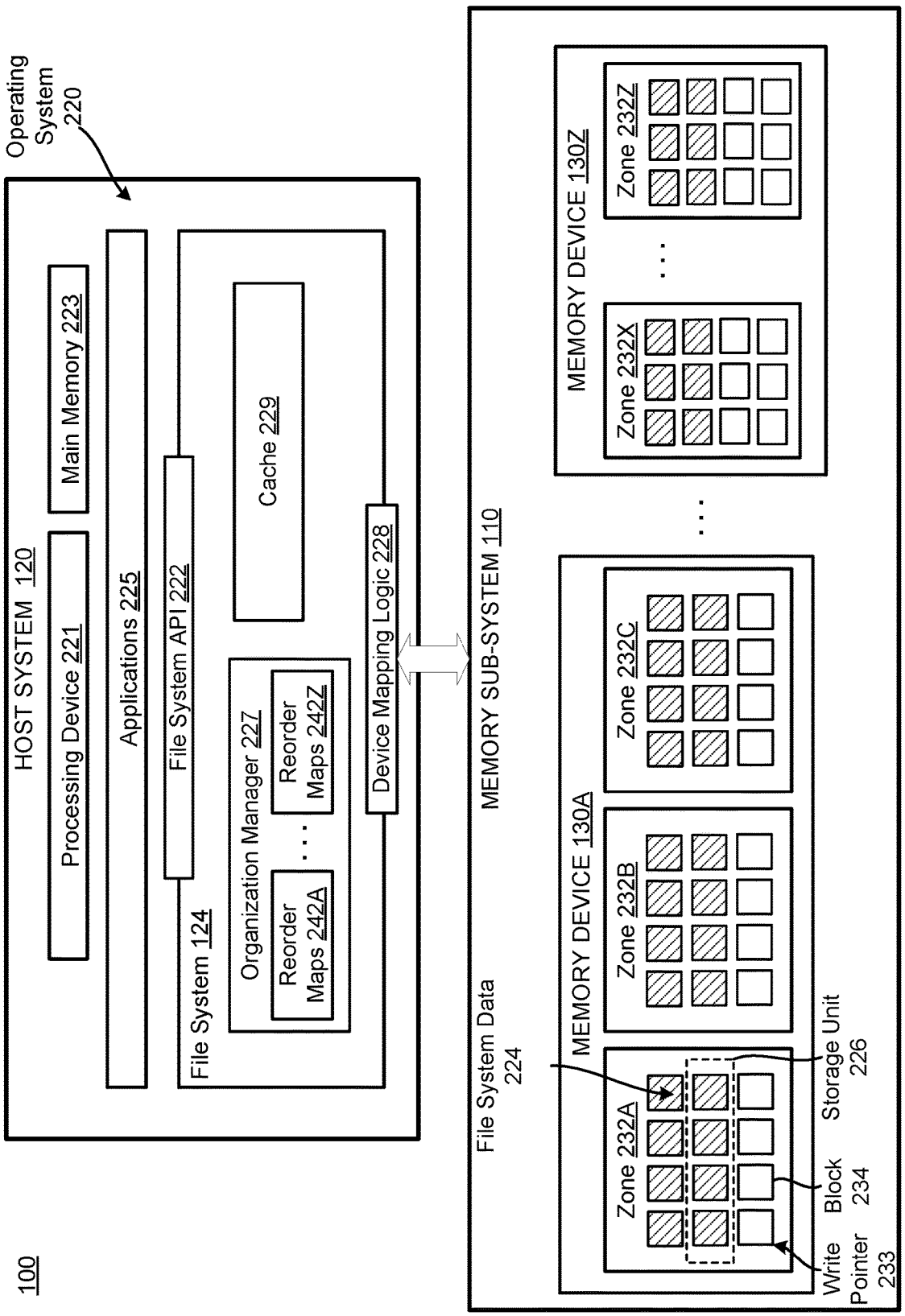
FIG. 2 is a detailed block diagram of the computing system of FIG. 1 in accordance with some embodiments of the present disclosure.

FIG. 2 is a detailed block diagram of the computing system 100 that includes a file system that uses the multiple zones of a memory sub-system to more efficiently store data. In the example shown, host system 120 includes a file system 124, one or more applications 225 and the memory sub-system 110 includes multiple zones 232A-Z that are spread across one or more memory devices 130A-Z.

File system 124 can manage the storage and retrieval of data from the memory sub-system 110. File system 124 can include data structures and rules used to organize the data and can involve separating the data into storage units that that can be individually identified and accessed. File system 124 can be integrated into a kernel, a device driver, an application, other portion of operating system 220, or a combination thereof. File system 124 can execute as one or more system processes (e.g., kernel processes), user processes (e.g., application processes), or a combination thereof.

File system 124 can include multiple layers and the multiple layers can include a logical file system (e.g., logical layer), a virtual file system (e.g., virtual layer), a physical file system (e.g., physical layer), or other layer. The logical file system can manage interaction with applications 225 and can provide an application program interface (e.g., File System API 222) that exposes file system operations (e.g., open, close, create, delete, read, write, execute) to other computer programs. The logical layer of file system 124 can manage security and permissions and maintain open file table entries and per-process file descriptors. The logical file system can pass requested operations (e.g., write requests) to one or more other layers for processing. The virtual file system can enable operating system 220 to support multiple concurrent instances of physical file systems, each of which can be referred to as a file system implementation. The physical file system can manage the physical operation of the storage device (e.g. memory sub-system 110). The physical file system can handle buffering and manage main memory and can be responsible for the physical placement of storage units in specific locations on the memory devices 130A-Z. The physical file system can include device mapping logic 228 and can interact with device drivers or with the channel to interact with memory sub-system 110. One or more of the file system layers can be explicitly separated or can be combined together in order to store file system data 224.

File system data 224 can be any data associated with file system 124 and can include data received by file system 124 or data generated by file system 124. File system data 224 can represent data of one or more external file system objects, internal file system objects, or a combination thereof. The external file system objects can be file system objects that are externally accessible by a computer program (e.g., applications 225) using file system API 222. The external file system objects can include files (e.g., file data and metadata), directories (e.g., folders), links (e.g., soft links, hard links), or other objects. The internal file system objects can be file system objects that remain internal to the file system and are inaccessible using file system API 222. The internal file system objects can include storage tree objects (e.g., extent map, extent tree, block tree), stream objects (e.g., stream identifiers), file group data (e.g., group of similar files), storage units, block groups, extents, or other internal data structures.

Each file system object can include object data and can be associated with object metadata. The object data can be the content of the object (e.g., file data) and the object metadata can be information about the object (e.g., file metadata). The object metadata can indicate attributes of the object such as a storage location (e.g., zone, block group, storage unit), data source (e.g., stream, application, user), data type (e.g., text, image, audio, video), size (e.g., file size, directory size), time (e.g., creation time, modification time, access time), ownership (e.g., user ID, group ID), permissions (e.g., read, write, execute), file system location (e.g., parent directory, absolute path, local path), other attribute, or a combination thereof. In one example, file system data 224 can include data for a new file and the new file can include file data and file metadata. The file data can include the content of the file (e.g., image content, audio content) and the file metadata can include one or more attributes of the content (e.g., identifier corresponding to a zone z, stream s, and/or application a).

The object data and object metadata (e.g., attributes, tree nodes) can be stored together in the same data structure at the same storage location or can be stored separately in different data structures at different storage locations. For example, file system 124 can store the object metadata in an index node (e.g., inode) data structure and the index node data structure can have one or more pointers to the object data. The inode can be a data structure in a Unix-style file system that describes a file system object. Each inode can indicate the attributes and storage locations (e.g., block addresses) of the data of the file system object. A directory can be represented as an inode and can contain an entry for itself, its parent (e.g., parent directory), and each of its children (e.g., child directories or files). File system 124 can store file system data 224 as one or more storage units 226.

Storage unit 226 can be a contiguous or non-contiguous portion of file system data that is to be stored in a memory device. The storage units can be referred to as file system storage units and can have any size (e.g., 4 KB, 128 KB, 16 MB, 128 MB, 1 GB) and the size can or cannot be based on (e.g. a multiple of) the size of one or more memory storage units (e.g., cells, blocks, pages, zones, dies, devices, or sub-systems). File system 124 can use a fixed size (e.g., constant size or static size) for the storage units in which all of the storage units can be the same size or can use a variable size (e.g., adjustable size, dynamic size) in which the storage units used by file system 124 can have different sizes. The size of the storage unit can be determined (e.g., selected or detected) by file system 124, host system 120, memory sub-system 110, memory device 130, other entity, or a combination thereof. The size of storage unit 226 can be determined by the entity before, during, or after design, development, manufacture, installation, initialization, configuration, formatting, other event, or a combination thereof. In one example, each of the storage units 226 can be the same or similar to a file system block group.

File system 124 can divide allocated space into block groups which can be variable-sized allocation regions. The allocation regions can be used to store object metadata (e.g., extent tree node, inodes) and object data (e.g., file content, extents). A block group (BG) can be understood as a contiguous portion a file system object (e.g., a series of LBAs) that is allocated to a contiguous area of a memory device and is reserved for file system data of file system 124. This contiguous area can be represented as a range of block numbers (e.g., physical addresses). Larger files can be partitioned into the block groups that are individually tracked to make allocation and management of the files feasible over a necessary series of allocation and writes to memory devices 130A-Z. The default ratio of object data to object metadata can be 1:2. They are intended to use concepts of the Orlov block allocator to allocate related file system objects together and resist fragmentation by leaving free space between groups (Ext3 block groups, however, have fixed locations computed from the size of the file system, whereas those in b-tree file system are dynamic and created as needed). Each block group can be associated with a block group identifier (e.g., block group item). Modes in the file system tree can include a reference to a corresponding block group (e.g., pointer to storage unit).

In the example shown in FIG. 2, file system 124 can include allocation manager 227 and cache 229 to manage reordered data received from the memory sub-system 110. Cache 229 can include a portion of main memory 223 structured as a data cache (or buffer) that stores reordered data from memory sub-system 110 so that such data can be accessed quickly by host system 120. Organization manager 227 can interact with applications 225 and/or memory sub-system 110 to reorder out-of-order data blocks retrieved from one or more zones of memory sub-system 110, and store the reordered data in cache 229. In particular, organization manager 227 can reorder the out-of-order data blocks using reorder maps 242A-Z received from applications 225. Each reorder map 242A-Z can include a data structure correlating each data block written in a zone to a correct position (e.g., via an offset value, a numbered position from the starting write pointer position of the zone, etc.) in the sequential order specified by the ordered set generated by application(s) 225. The structured set can be a structured set of data (arrays, structures, class instances, objects, etc.) in a sequential order of data blocks.

As mentioned, each reorder map can be received by organization manager 227 from an application (e.g., applications 225). For example, an application can send a write command (e.g., a zone append command) to the memory sub-system 110 to program blocks of data to a zone (e.g., zone 232A-Z). Responsive to completing the program command, the memory sub-system 110 (e.g., via the memory sub-system controller 115) can send back to the application the block allocation metadata. The application can use the block allocation metadata (e.g., the logical addresses of a contiguous area of blocks in a zone) to map the zone in a set of logical addresses. Based on the block allocation metadata and the file metadata relating to the write commands (e.g., the intended structured order of the data blocks), the application can generate a reorder map for the data blocks retrieved from the zone.

In an illustrative example, the reordered maps can be structured as a log-structured merge-tree (LSM) using a Sorted Strings Table (SSTable) format. When a segment of a SST is written it becomes immutable (the SST will be destroyed as a whole at some point in the future but it can't be modified). Each segment can include a reordered map. The application 225 can generate each reorder map responsive to two or more write commands (e.g., zone append commands) being completed. Each time a zone append commands finishes programming, the zone append command returns, to the application 225, the LBA at which the data was programmed in the zone. The application 225 can use the LBAs to generate the reordered map. The application 225 can then send the reordered map the organization manager 227, and the segment is memory mapped in cache 229. Then the data associated with the segment (e.g., a data block) is available (in order) in cache 229 and ready to be read by application 225.

FIGS. 3A-3B schematically illustrate example reorder maps generated by the applications, in accordance with aspects of the present disclosure. In particular, FIG. 3A illustrates an example reorder map 310 and FIG. 3B illustrates an example offset reorder map 320. Position reorder map 310 can be a data structure that indicates the mapping of the position of a given data block in the ordered set to its corresponding position programmed in the zone. As shown in position reorder map 310, the structured order of the data is represented by data block 0, followed by data block 1, followed by data block 2, and followed by data block 3. By way of example, during the programming operations performed by the memory sub-system 110, data block 0 was programmed to the second block of a zone (e.g., LBAs 4096-8191), data block 1 was programmed to the first block of the zone (e.g., LBAs 0-4095), data block 2 was programmed to the fourth block of the zone (e.g., LBAs 12288-16383), data block 3 was programmed to the second block of the zone (e.g., LBAs 8192-12287). Accordingly, position reorder map 310 indicates that data block 0 is programmed to the second block of the zone, data block 1 is programmed to the first block of the zone, data block 2 is programmed to the fourth block of the zone, and data block 3 is programmed to the third block of the zone. Alternatively (not shown), position reorder map 310 can indicate that data block 0 is programmed to LBAs 4096-8191 of the zone, data block 1 is programmed to LBAs 0-4095 of the zone, data block 2 is programmed to LBAs 12288-16383 of the zone, and data block 3 is programmed to LBAs 8192-12287 of the zone.

Offset reorder map 320 can be a data structure that indicates the distance (e.g., offset) between the position of a data block in the structured set to actual block position programmed in the zone. Using the above illustrated example, the structured order of the data is represented by data block 0, followed by data block 1, followed by data block 2, and followed by data block 3, whereas data block 0 is programmed to the second block of the zone, data block 1 is programmed to the first block of the zone, data block 2 is programmed to the fourth block of the zone, and data block 3 is programmed to the third block of the zone. Accordingly, offset reorder map 320 indicates that data block 0 has been programmed to one block above (indicated by 1 in offset reorder map 320) its intended position (e.g., block 1 in the zone), data block 1 has been programmed to one block below (indicated by −1 in offset reorder map 320) its intended position (e.g., block 0 in the zone), data block 2 has been programmed to one block above its intended position (e.g., block 3 in the zone), data block 3 has been programmed to one block below its intended position (e.g., block 2 in the zone). It is noted that using offset values rather than LBAs in the reorder maps can reduce the memory overhead of the reorder maps by using a single byte to indicate the block position.

Returning to FIG. 2, memory sub-system 110 can include high density non-volatile memory devices where retention of data is desired when no power is supplied to the memory device. One example of non-volatile memory devices is a negative-and (NAND) memory device. Other examples of non-volatile memory devices are described above in conjunction with memory device 130 of FIG. 1. A non-volatile memory device is a package of one or more dies with sets of blocks (e.g., physical blocks) and each block can include a set of pages. A page can include a set of cells (e.g., memory cells) and each cell can be an electronic circuit that stores information. Depending on the cell type, a cell can store one or more bits of binary information and can have various logic states that correlate to the number of bits being stored. The logic states can be represented by binary values, such as "0" and "1", or combinations of such values.

Memory devices 130A-Z can be made up of bits arranged in a two-dimensional grid. Memory cells are typically joined by wordlines (conducting lines electrically connected to the cells' control gates) and programmed together as memory pages (e.g., 16 KB or 32 KB pages) in one setting (by selecting consecutive bitlines connected to the cells' source and drain electrodes). The intersection of a bitline and wordline can constitute the address of the memory cell. A block 234 can refer to a unit of the memory device (e.g., 130A) used to store data and can include a group of memory cells, a wordline group, a wordline, or individual memory cells. One or more blocks can be grouped together to form a zone of a memory device.

Each of the zones 232A-Z can be a contiguous or non-contiguous portion of a memory device (e.g., range of blocks) that is identified and managed as a single unit. Each zone can have a corresponding zone identification data that can be used to uniquely identify the zone and can include a zone identifier (zone ID), a zone descriptor, or a zone label. A zone can be a memory storage unit and can have a predefined size based on (e.g. a multiple of) a size of another memory storage unit (e.g., cell, block, page, die, device, or sub-system). Memory sub-system 110 can use a fixed size (e.g., constant size or static size) for the zones in which all of the zones can be the same size or can use a variable size (e.g., adjustable size, dynamic size) in which the zones used by memory sub-system 110 can have different sizes. The size of the zone can be determined by memory sub-system 110, memory device 130, file system 124, host system 120, other entity, or a combination thereof.

Zones 232A-Z can enable efficient management of storage space of the memory device. For example, a set of one or more zones can be designated for use by a specific application (e.g., application, process, or thread) executed by the host system or some other system with access to the memory device. Writing to the zones is generally performed sequentially. The sequential write can be performed consecutively from the top of the memory device (e.g., smaller addresses of IC die) to the bottom of the memory device (e.g., larger addresses of the IC die), which is illustrated by the patterned blocks of data already written to the illustrated zones 232A-Z. In these embodiments, the device mapping logic 228 can track block numbers (e.g., logical block addresses) of a name space.

The namespace can include the address space of one or more of the memory devices 130A-Z. A namespace is a quantity of non-volatile memory that can be formatted into blocks (e.g., logical or physical blocks). A controller for memory devices 130A-Z (e.g., controller 115 or 135) can support multiple namespaces that are referenced using namespace identification data (e.g., namespace IDs). A namespace can be associated with a namespace data structure that is created, updated, or deleted using Namespace Management and Namespace Attachment commands. The namespace data structure can indicate capabilities and settings that are specific to a particular namespace. In one example, the name data structure and the namespace can correspond to a zoned namespace.

A zoned namespace (ZNS™) can be a sequential namespace that is defined by the NVM Express' (NVMe™) Specification. A memory device that is configured with a zone namespace can be referred to as a zoned namespace memory device or a ZNS memory device and can implement the Zoned Namespace Command Set as defined by NVMe. In a zone namespace, the address space of each of the memory devices 130A-Z can be divided into one or more zones 232A-Z. When using a zone namespace, writes are performed sequentially starting from the beginning of a zone and can be performed at a larger granularity (e.g., 64 kilobytes) and the zone can be inaccessible for the duration of the write operation. Accordingly, if a read request for data stored in the same zone or a different zone is received while the write operation is ongoing, the memory sub-system will have to suspend the write operation in order to perform the read. In one example, the zoned namespace can be implemented by a controller of a solid state drive (SSD) and include zones 232A-Z, in which there can be one or more zones for each of the one or more memory devices 130A-Z.

Each of zones 232A-Z can correspond to a write pointer (WP) that identifies a location in the zone where a prior sequential write ended. The write pointer 233 can correspond to zone 232A and can point to a beginning of a block (e.g., first available block), an end of a block (e.g., last block written to), a location within a block, or other location. Write pointer 233 can be stored and accessible to the controller of memory device 130A (e.g., controller 135), a controller of memory sub-system 110 (e.g., controller 115), processing device 221 of host system 120 (e.g., in main memory 223), other device or location, or a combination thereof. The write pointer can be used to determine whether an IO write request is directed to the write pointer, and thus is sequential, or is not directed to the write pointer, and is thus non-sequential. The write pointer for each zone can be accessible to the file system 124 for purposes of storage space allocation within the memory device 130A. For example, write pointer 233 can be stored as metadata of a file system object (e.g., metadata of a file system block group) and be used for sequential writes, as discussed in more detail below.

File system 124 can include a file system API 222 that enables computer programs (e.g., applications 225) to store or retrieve data. File system API 222 can enable file system 124 to receive data from external sources, including data from applications 225 (also referred to as user data), operating system (e.g., superblocks of data, file system metadata, and the like). With access to such metadata about these various files of different data types, the file system API 222 can be able to enable file system 124 to perform organization and storage allocation.

The applications 225 can include different types of computer programs or architectures, which function differently with respect hardware and supporting software of the computing system 100. In one embodiment, applications 225 can include a log structure merge (LSM)-based architecture such as a database (e.g., Apache Cassandra™), a staged event-driven architecture (e.g., SEDA), a distributed storage and replication architecture (e.g., Dynamo by Amazon®), a data and storage engine model (e.g., Bigtable by Google®), or other such storage engines designed to process and organize structured data, including big data, for example. In some embodiments, using an LSM-based architecture as an example, the applications 225 can handle a variety of files containing data and/or metadata of different data types. Each of the applications 225 can thus generate, access, and/or manage files of one or more data types.

Figure 4:
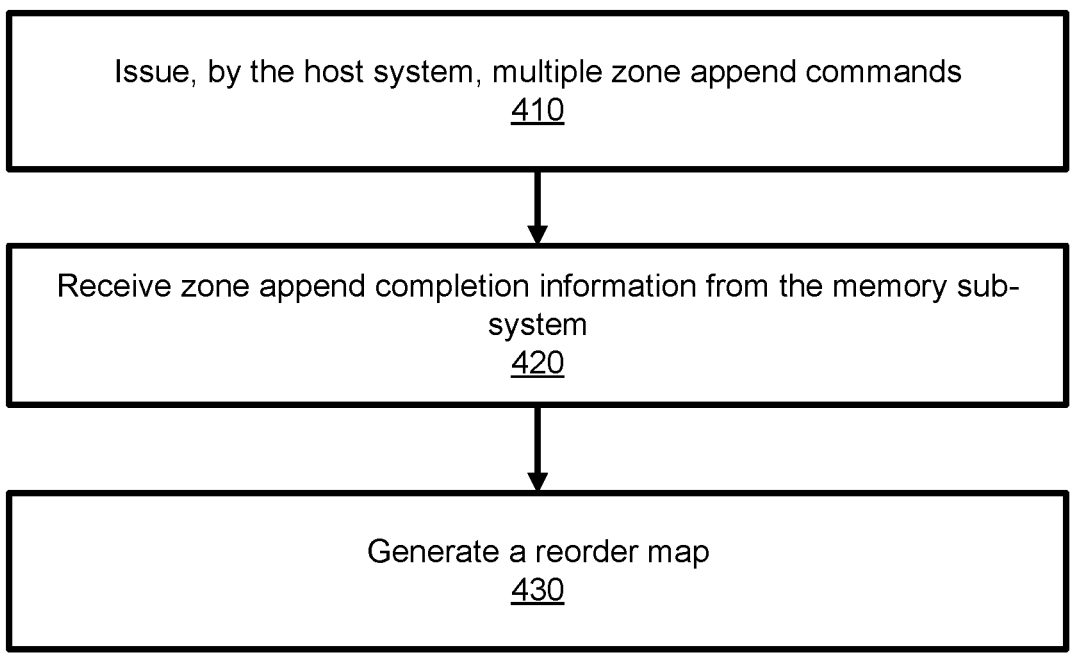
FIG. 4 is a flow chart of a method for generating a reorder map, in accordance with some embodiments of the present disclosure.

FIG. 4 is a flow chart of a method 400 for generating a reorder map, according to embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the host system 120 (e.g., via execution of the file system 124 by processing device 221) of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a processing device of a host system can issue multiple zone append commands to a memory sub-system including a memory device. The memory device can include multiple zones. Each zone append command can be a write operation (corresponding to a data block of a structured set of data) that specifies the first logical block of a zone as the write position. When executing the write command, the memory sub-system controller can write the data within the zone indicated, but do so at the current zone write pointer position, which can be repositioned to the next block in the zone in response to an executed zone append command.

At operation 420, the processing device can receive block allocation metadata from the memory sub-system. The block allocation metadata can include the locations (e.g., logical block addresses) of each data block in the memory device corresponding to a specific zone. Receiving the block allocation metadata can involve the host system receiving the block allocation metadata from a controller of the memory sub-system. The block allocation metadata can indicate a size, a state, or a write pointer of each of each data block programmed to the zone. The write pointer can be a location of a memory device (e.g., logical block address (LBA)). In one example, the memory sub-system can be a Solid State Drive (SSD) and the zones can be zones that comply with Zoned Namespaces (ZNS).

At operation 430, the processing device generates a reorder map. For example, the processing device can use the block allocation metadata (e.g., the logical addresses of a contiguous area of blocks in a zone) to map the zone in a set of logical addresses. Based on the block allocation metadata and the file metadata relating to the write commands (e.g., the intended structured order of the data blocks), the application can generate a reorder map for the data blocks retrieved from the zone. The reorder map can include a position reorder map, a offset reorder map, or any other data structure capable of indicating the correlation between the intended position of the data blocks to the actual positions of the data blocks in the zone. As will be explained in greater detail in FIG. 5, the reorder map can be sent to file system 124 along with a read access command requesting the data.

Figure 5:
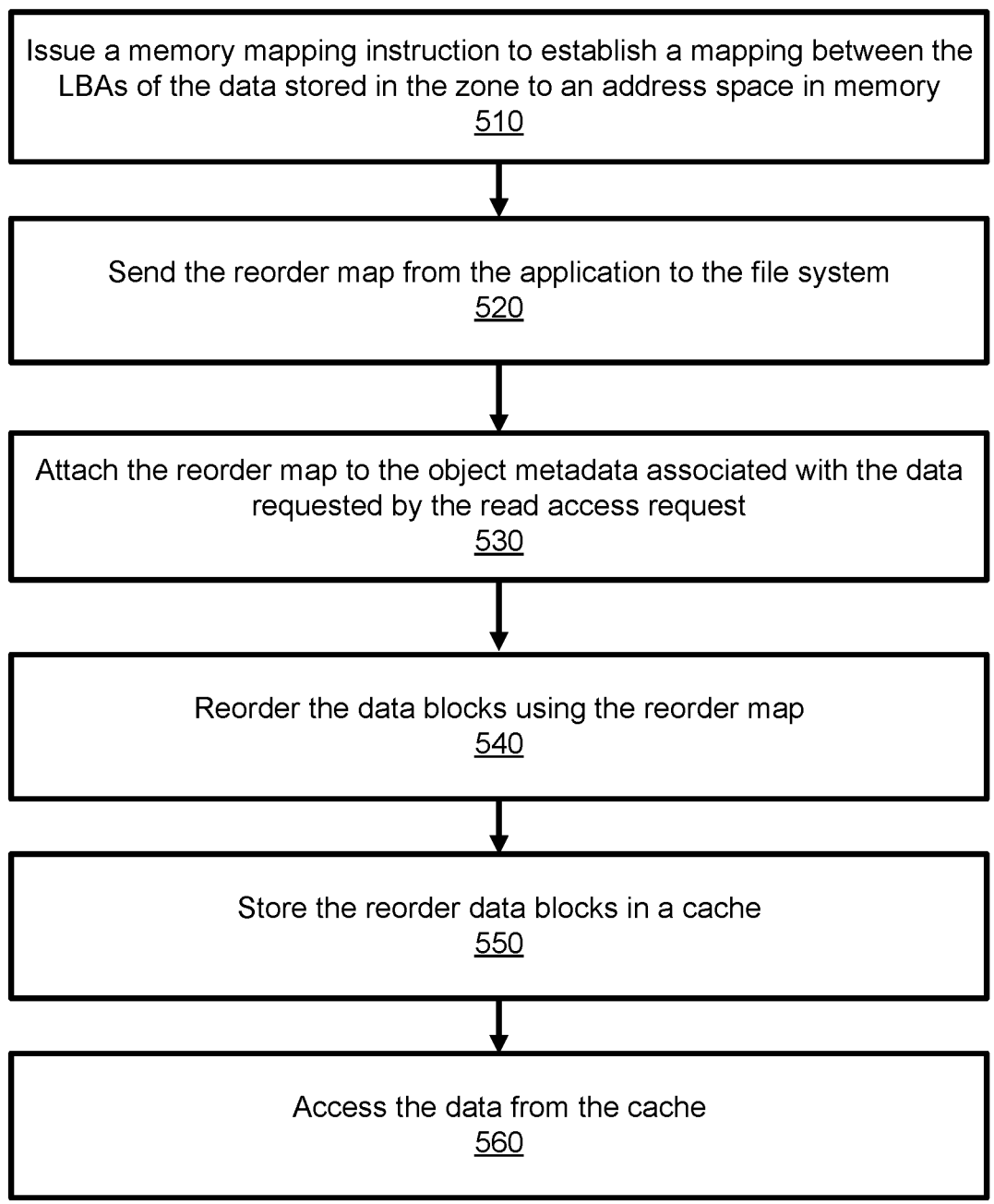
FIG. 5 is a flow chart of a method for reordering data retrieved from a zone of a memory device, in accordance with some embodiments of the present disclosure.

FIG. 5 is a flow chart of a method 500 for reordering data retrieved from a zone of a memory device, according to embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the host system 120 (e.g., via execution of the file system 124 by processing device 221) of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, a processing device of the host system can issue a memory mapping instruction, such as mmap( ) system call (which maps files or devices from the non-volatile memory into the volatile memory), to establish a mapping between the LBAs of the data stored in the zone of the memory sub-system to an address space in main memory 223 or another volatile memory device (e.g., memory device 140). A system call can be a service request from the kernel of the operating system on which the application is executed. In particular, the memory mapping instruction may request the LBAs of the data blocks stored in the zone. In some embodiments, operation 510 is performed responsive to an application being executed by the host system issuing a read access request for the data stored in the zone.

At operation 520, the processing device of the can send the reorder map from the application to the file system. For example, the application can execute a system call, such as input/output control (ioctl), to send the reorder map to the file system. In some embodiments, the processing device can generate the reorder map using the operations described in FIG. 4.

At operation 530, the processing device can attach the reorder map to the object metadata associated with the data requested by the read access request. In some embodiments, the object metadata can be stored, by the file system, in an index node (inode) data structure.

At operation 540, the processing device can reorder the data blocks using the reorder map. For example, the processing device can read the data blocks retrieved from the memory device, and reorder the data blocks using the reorder map.

At operation 550, the processing device can store the reordered data blocks in a cache. For example, the processing device can store the reordered data blocks in cache 229.

At operation 560, the processing device can access the data (e.g., the reordered data blocks) from the cache. For example, the application can access the requested data from cache 229.

Figure 6:
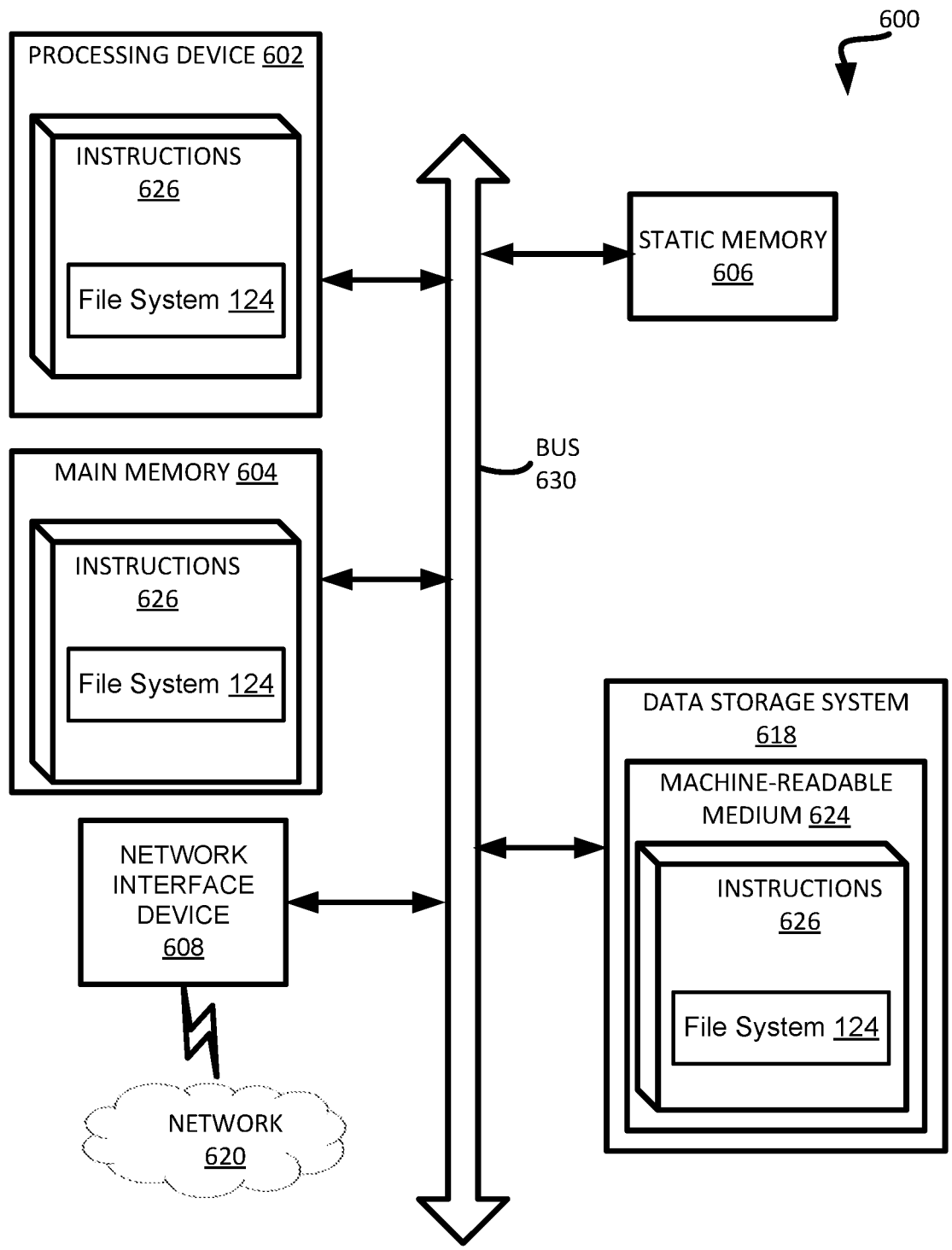
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIGS. 1-2) that includes, is coupled to, or utilizes a memory sub-system (e.g., memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the file system 124 of FIGS. 1-2. While the machine-readable storage medium 624 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
sending, by a host system to a memory sub-system comprising a memory device, a plurality of write commands;
receiving, by the host system from the memory sub-system, block allocation metadata, wherein the block allocation metadata references one or more locations in the memory device corresponding to a zone;
generating, by the host system, a reorder map based on the block allocation metadata and file metadata associated to the plurality of write commands, wherein the reorder map associates each data block of a set of data blocks to its corresponding programmed position in the zone;
storing the reorder map in a file system associated with the host system;
reading a plurality of data blocks associated with the zone; and
reordering, by the host system, the plurality of data blocks based on the reorder map.

2. The method of claim 1, wherein the memory sub-system comprises a Solid State Drive (SSD) and wherein the zone comprises a mapping space associated with logical block address space.

3. The method of claim 1, wherein the reorder map comprises a data structure that indicates a mapping of a position of each data block in a structured set of data correlated to a logical block number as counted from an initial zone write pointer position.

4. The method of claim 1, wherein the reorder map comprises a data structure that indicates an offset value between a position of each data block in the structured set of data and a logical block number as counted from an initial zone write pointer position.

5. The method of claim 1, further comprising:
storing data associated with the reordered plurality of data blocks in a cache.

6. The method of claim 1, further comprising:
sending, by a application to the file system, the reorder map using a system call.

7. The method of claim 1, wherein the block allocation metadata comprises, for each of the plurality of data blocks, a corresponding logical block address.

8. The method of claim 1, further comprising
generating the reordered map using file metadata associated with the plurality of data blocks.

9. The method of claim 1, wherein generating the reorder map is performed by an application operating on a kernel of the host system.

10. The method of claim 1, wherein reordering the plurality of data blocks based on the reorder map is performed by a file system operating on a kernel of the host system.

11. The method of claim 1, wherein reading a plurality of data blocks associated with the zone comprises issuing a memory mapping instruction using an mmap( ) system call.

12. A system comprising:
a memory device; and
a processing device, operatively coupled with the memory device, to perform operations comprising:
responsive to a read access request, issuing a memory mapping instruction to establish a mapping between logical block addresses of a plurality of data blocks programmed to a zone of a memory sub-system to an address space in the memory device;
sending, to a file system, a reorder map generated based on block allocation metadata associated with the plurality of data blocks programmed to the zone and file metadata associated to the plurality of write commands, wherein the reorder map associates each data block of a set of data blocks to its corresponding programmed position in the zone;
reordering, by the file system, the plurality of data blocks based on the reorder map;
storing data associated with the reordered plurality of data blocks in a cache; and
accessing the reordered plurality of data blocks from the cache.

13. The system of claim 12, wherein the reorder map comprises a data structure that indicates a mapping of a position of each data block in a structured set of data correlated to a logical block number as counted from an initial zone write pointer position.

14. The system of claim 12, wherein the reorder map comprises a data structure that indicates an offset value between a position of each data block in the structured set of data and a logical block number as counted from an initial zone write pointer position.

15. The system of claim 12, wherein the reorder map is generated using file metadata associated with the plurality of data blocks.

16. The system of claim 12, wherein the memory mapping instruction comprises an mmap( ) system call.

17. A non-transitory computer-readable medium storing instructions, which when executed by a processing device, cause the processing device to perform operations comprising:
sending a plurality of write commands;
receiving block allocation metadata, wherein the block allocation metadata references one or more locations in a memory device corresponding to a zone;
generating, by a host system, a reorder map based on the block allocation metadata and file metadata associated to the plurality of write commands, wherein the reorder map associates each data block of a set of data blocks to its corresponding programmed position in the zone;
storing the reorder map in a file system associated with the host system;
reading a plurality of data blocks associated with the zone; and
reordering the plurality of data blocks based on the reorder map.

18. The non-transitory computer-readable medium of claim 17, wherein the reorder map comprises a data structure that indicates a mapping of a position of each data block in a structured set of data correlated to a logical block number as counted from an initial zone write pointer position.

19. The non-transitory computer-readable medium of claim 17, wherein the reorder map comprises a data structure that indicates an offset value between a position of each data block in the structured set of data and a logical block number as counted from an initial zone write pointer position.

20. The non-transitory computer-readable medium of claim 17, wherein the processing device further performs operations comprising:
storing data associated with the reordered plurality of data blocks in a cache.

* * * * *